Sept. 1, 1931.    T. E. MURRAY, JR., ET AL    1,821,663
PRODUCTION OF VEHICLE WHEELS
Filed Sept. 17, 1924    3 Sheets-Sheet 2

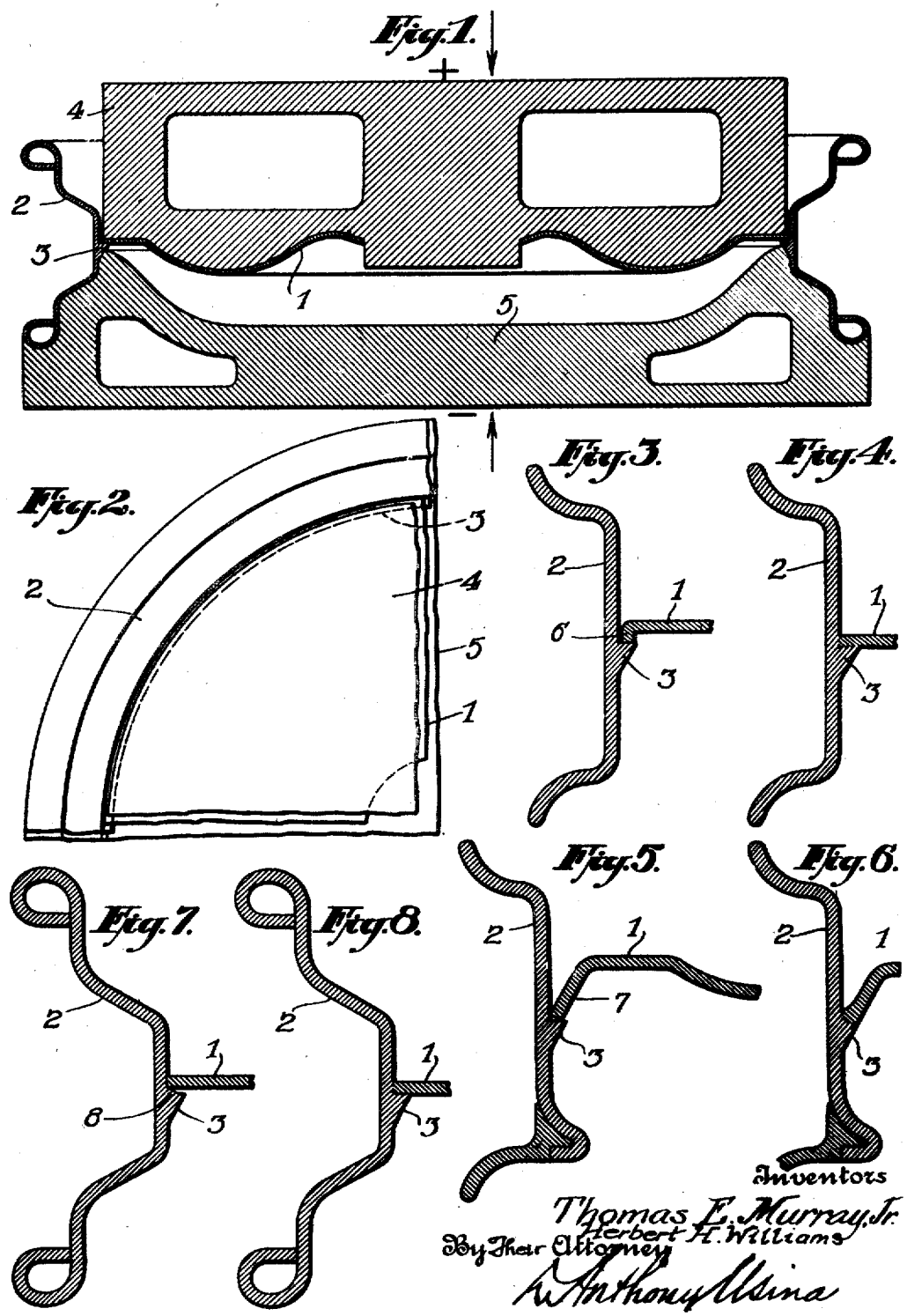

Inventors
Thomas E. Murray, Jr.
Herbert H. Williams
By their Attorney
D. Anthony Usina Sept. 1, 1931.  T. E. MURRAY, JR., ET AL  1,821,663
PRODUCTION OF VEHICLE WHEELS
Filed Sept. 17, 1924  3 Sheets-Sheet 3

Inventors
Thomas E. Murray, Jr.
Herbert H. Williams
By their Attorney

Patented Sept. 1, 1931

1,821,663

UNITED STATES PATENT OFFICE

THOMAS E. MURRAY, JR., OF BROOKLYN, AND HERBERT H. WILLIAMS, OF NEW YORK, N. Y.; SAID WILLIAMS ASSIGNOR TO SAID MURRAY, JR.

PRODUCTION OF VEHICLE WHEELS

Application filed September 17, 1924. Serial No. 738,292.

In making metal wheels for vehicles, and particularly for automobiles, efforts have been made to provide a welded connection between an annular part, such as the rim or brake drum, and the body of the wheel, or between the rim and a ring or set of lugs, to which the body can be attached. Such a welding operation involves considerable difficulties which it is the aim of the present invention to avoid or reduce to a minimum.

The accompanying drawings illustrate embodiments of the invention.

Fig. 1 is an axial section illustrating the operation of welding a disc to the inside of a rim.

Fig. 2 is a plan of a part of Fig. 1.

Figures 3 to 16 are sectional views illustrating modifications in detail of the shapes of the parts which are welded together. Figs. 3 and 4, Figs. 5 and 6, Figs. 7 and 8, and Figs. 9 and 10 illustrate the different shapes respectively before and after welding. Figs. 11 to 16 illustrate other shapes before welding.

Figure 17:
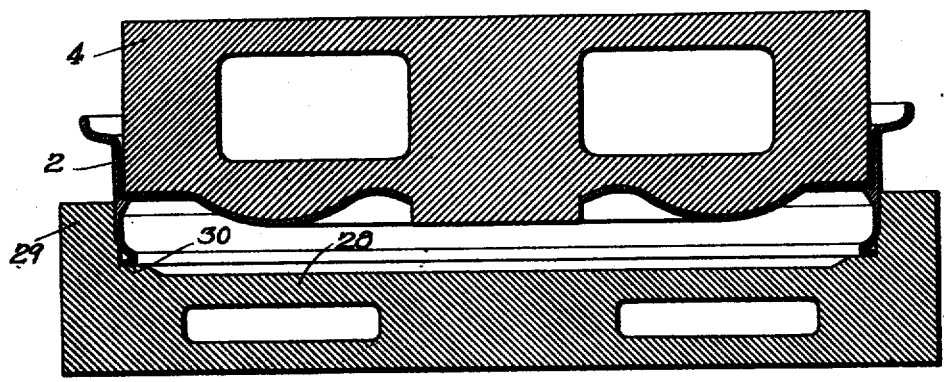

Fig. 17 is an axial section illustrating the operation of welding a disc to a different type of rim.

Figure 18:
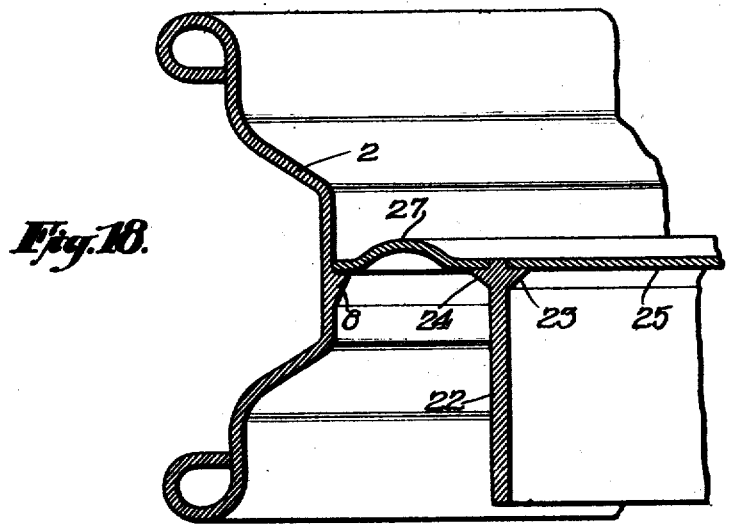

Fig. 18 is a radial section through a rim and brake drum, illustrating the application of the invention thereto.

In Fig. 1 there is shown a disc 1, the outer edge of which is to be welded to a circular rim 2. Such rims are generally made of rolled steel of uniform thickness, and the discs of sheet steel stamped to desired shapes and radial sections. The uniting of the edge of the disc to the flat inner face of the rim presents considerable difficulties in the pressing of the parts together during the welding operation and in the rapid radiation of heat from the joint owing to the great surface of the parts adjacent to the joint. I shape the parts so that they can be pressed together in the axial direction, which can be easily done and not involve any distortion of the parts. A shoulder is provided on the inner side of the rim against which the edge of the disc is pressed. Such a shoulder is provided, according to Fig. 1, by forming a projection 3 on the inner side of the rim, which projection can be rolled integral with the rim. Preferably this projection is formed by enlarging the thickness of the rim rather than by bending the latter, so that a certain quantity of the metal can be fused and taken up in the welding operation without diminishing the thickness of the rim itself.

The parts are placed together, as illustrated, between a pair of electrodes 4 and 5 which are pressed together in the axial direction, while a welding current is passed. Preferably the method of welding is that described in the Murray Reissue Patent No. 15,466 of October 10, 1922, in which the parts are pressed together while a current is passed across the joint, of high ampere strength and brief duration. This is particularly important in that the welding is accomplished so rapidly as to offset in a considerable measure the rapid conduction of heat into the surrounding metal and radiation therefrom. In order to diminish heat losses it is also important to bring the electrodes into contact with the work-pieces as close to the joint as possible. This is facilitated by the axial direction in which the electrodes are moved. Fig. 1 illustrates the electrode 4 extending very close to the edge of the disc 1 and the electrode 5 extending very close to the shoulder of the projection 3, leaving only a sufficient clearance to permit the required taking up of metal when the parts are pressed toward each other during the welding. The projection 3 may be a continuous ring extending entirely around the inside of the rim 2, or it may be a succession of segments or lugs.

The shape of this projection in cross-section and the shape of the edge of the disc may be considerably varied. The invention is applicable to rims of a great variety in shape and to discs of great variety, and not only to discs, but also to various other parts which are to be attached to rims, brake drums, hubs and so forth. Some of the variations are illustrated in the succeeding figures.

According to Fig. 3 the disc 1 is provided with a short flange 6 which presents an edge to the shoulder of the projection 3 and thus allows for a certain take-up of metal in the welding operation; the finished joint being substantially as in Fig. 4, where the flange 6 has been removed by fusing and squeezing out under pressure.

According to Fig. 5 another standard type of rim 2 is illustrated and a disc 1 is shown which has a long oblique flange 7 on the end. This makes point contacts with the projection 3 and thus concentrates the heat at the beginning of the welding operation. This edge is taken up to some extent in welding until a good joint is made, as shown in Fig. 6.

Fig. 7 illustrates another common style of rim joined to a disc 1 which is flat on its edge. The projection 3 on the disc, however, is provided at its upper edge with a shoulder 8 which is oblique at the inner portion, so as to make a reduced contact with the flat edge of the disc at the beginning of the operation and thus to concentrate the heat; this oblique portion of the shoulder being taken up and disappearing in the joint when completed, as in Fig. 8.

Figure 9:
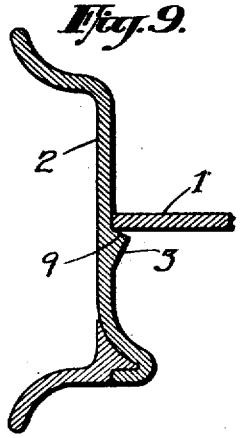
Figure 10:
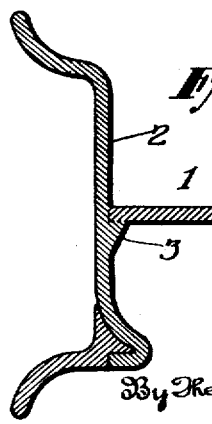

According to Fig. 9 the entire upper face 9 of the projection is oblique, and all of the excess metal thus provided is taken up in the finished joint Fig. 10.

Figure 11:
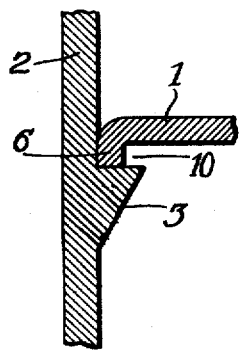

According to Fig. 11 the projection 3 is made wider than the bearing flange 6 on the edge of the disc 1. There is thus provided a space 10 between the two which accommodates and catches the flash or extruded metal.

Figure 12:
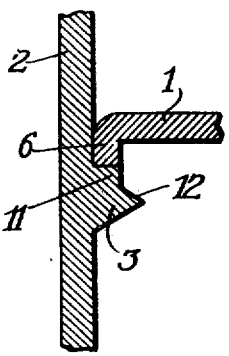

According to Fig. 12, the projection 3 is made with an upper portion 11 of the same width as the edge of the flange 6 on the disc, so as to lessen the radiation which would occur from a wider face (as in Fig. 11); and below the part 11 the projection has an inward tapering face 12 to accommodate the flash produced by the fusing of the parts 6 and 11.

Figure 13:
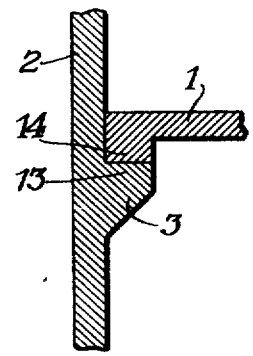

The projection 3 will be made of such depth as to permit the take-up of a certain portion of it in the welding operation. Fig. 13 illustrates it with a tapered lower portion and with extra depth produced by a rectangular portion 13 at the top equal in width to the contact edge of the disc. This figure also illustrates the provision of a flange 14 on the disc 1 which has a contact edge of greater width than the thickness of the disc. Such a flange is produced by swaging or upsetting the edge of the disc. This operation produces also a square face on the peripheral edge of the disc which gives a better contact with the inner face of the rim than is secured by the rounded face in Fig. 12 produced by bending down the flange 6.

Figure 14:
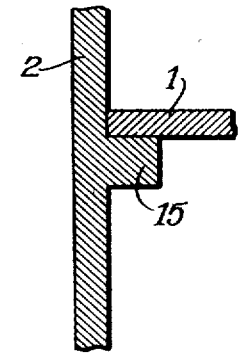
Figure 15:
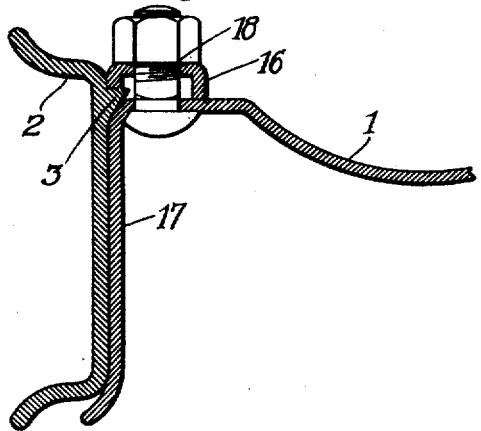

Fig. 14 illustrates the application of a disc which is flat on the edge to a projection 15 which is rectangular in section so as to provide a square under face for bearing against the electrode.

Figure 16:
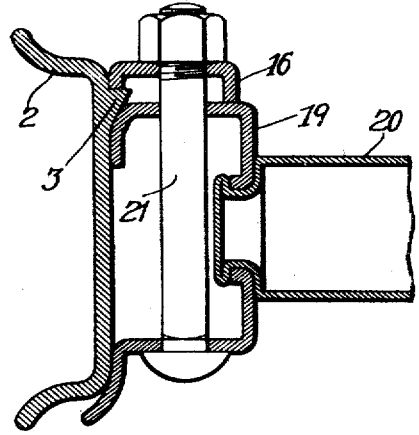

In Fig. 16 we have illustrated the method applied to the welding of a ring 16 to a rim 2. The ring is provided with a flange on its edge welded to a projection 3 on the rim in the manner indicated in Fig. 11. The disc 1 has a flange 17 bearing against the inner side of the rim and has a flat portion bearing against the tapered under side of the projection 3 of the rim and bearing also against an internal flange on the ring 16. A bolt 18 passing through the ring 16 and the disc is used to fasten the latter in place.

Fig. 16 illustrates the same idea applied to the fastening of a certain standard wheel center within the rim. The wheel center comprises a ring or felloe 19 mounted on the ends of spokes 20. The parts are held together by bolts 21 passing through the welded ring 16 and through the felloe and drawing the latter up against the under side of the shoulder 3 and the inner flange of the ring 16. The same idea may be applied to various other styles of wheel center and rim.

The joint is welded not only between the disc and the projection 3 but also between the edge of the disc and the inner face of the rim. A wide edge on the disc, as in Fig. 13 for example, will therefore result in a better joint.

The invention is applicable to the welding of various other annular parts than the rims referred to above, such, for example, as brake drums, hubs and the like. Fig. 18 shows a brake drum 22 made of a plate or sheet and provided with projections 23 and 24 near the inner edge, having transverse faces to which are applied the central portion 25 of the disc and a ring 27 which constitutes a continuation of the disc, the latter being welded, in turn, to the transverse face of a projection 8 on a rim 2 of the style illustrated in Fig. 7.

The inner part of the wheel referred to herein may be the disc 1 or any of the other parts above referred to which are located on the inside of the tire-carrying rim; and this would include the parts 25 and 27 of Fig. 18, though the latter is outside of the brake drum 22 to which it is welded. All these inner parts are substantially or approximately in planes transverse to the axis of the wheel and therefore are defined herein as transverse parts.

Fig. 17 illustrates a modification in the shape of the electrodes in the case of a rim 2 of the shape shown in Figs. 5 and 9. The upper electrode 4 is similar to that in Fig. 1, since it has only to fit the disc of the wheel. The lower electrode 28, however, has flanges 29 fitting against the outside of the rim 2 and holding it steady while a shoulder 30 holds the rim up into place. Since the shoulder 30 is remote from the point of the weld the flange 29 is made to extend practically up to such point so as to get the efficient heating effect desired and the concentration of heat at the welding point.

No claim is made in the present application, to the welding process described.

Though we have described with great particularity of detail certain embodiments of our invention, yet it is not to be understood therefrom that the invention is restricted to the specific embodiments disclosed. Various modifications thereof may be made by those skilled in the art without departing from the invention as defined in the following claim.

What we claim is:—

A wheel having a rim with an inward projection having a face transverse to the axis, an inner part welded to said transverse face of the projection, the parts being fused together along a meeting plane transverse to the axis, and a third part bearing in a direction parallel to the axis against said projection and said inner part and held in place by a bolt engaging said third part.

In witness whereof, we have hereunto signed our names.

THOMAS E. MURRAY, Jr.
HERBERT H. WILLIAMS.

der 30 holds the rim up into place. Since the shoulder 30 is remote from the point of the weld the flange 29 is made to extend practically up to such point so as to get the efficient heating effect desired and the concentration of heat at the welding point.

No claim is made in the present application, to the welding process described.

Though we have described with great particularity of detail certain embodiments of our invention, yet it is not to be understood therefrom that the invention is restricted to the specific embodiments disclosed. Various modifications thereof may be made by those skilled in the art without departing from the invention as defined in the following claim.

What we claim is:—

A wheel having a rim with an inward projection having a face transverse to the axis, an inner part welded to said transverse face of the projection, the parts being fused together along a meeting plane transverse to the axis, and a third part bearing in a direction parallel to the axis against said projection and said inner part and held in place by a bolt engaging said third part.

In witness whereof, we have hereunto signed our names.

THOMAS E. MURRAY, Jr.
HERBERT H. WILLIAMS.

CERTIFICATE OF CORRECTION.

Patent No. 1,821,663.   Granted September 1, 1931, to

THOMAS E. MURRAY, JR., ET AL.

It is hereby certified that the above numbered patent was erroneously issued to the inventor, said "Murray, Jr." as sole owner of the entire interest in said invention, whereas said patent should have been issued to Metropolitan Engineering Company, a corporation of New York, said corporation being assignee by mesne assignments, of the entire interest in said invention, as shown by the records of assignments in this office; and that the said Letters Patent should be read with this correction therein that the same may conform to the record of the case in the Patent Office.

Signed and sealed this 3rd day of November, A. D. 1931.

M. J. Moore,
Acting Commissioner of Patents.

(Seal)

CERTIFICATE OF CORRECTION.

Patent No. 1,821,663.  Granted September 1, 1931, to

THOMAS E. MURRAY, JR., ET AL.

It is hereby certified that the above numbered patent was erroneously issued to the inventor, said "Murray, Jr." as sole owner of the entire interest in said invention, whereas said patent should have been issued to Metropolitan Engineering Company, a corporation of New York, said corporation being assignee by mesne assignments, of the entire interest in said invention, as shown by the records of assignments in this office; and that the said Letters Patent should be read with this correction therein that the same may conform to the record of the case in the Patent Office.

Signed and sealed this 3rd day of November, A. D. 1931.

(Seal)

M. J. Moore,
Acting Commissioner of Patents.